(12) United States Patent
Bullinga et al.

(10) Patent No.: US 7,354,098 B2
(45) Date of Patent: Apr. 8, 2008

(54) STEEP-BACK VEHICLE HAVING AN OPEN BODY

(75) Inventors: Albert Bullinga, Sindelfingen (DE); Klaus Laue, Dreieich (DE); Jan Hesse, Bietigheim-Bissingen (DE); Marcus Papendorf, Besigheim (DE)

(73) Assignee: Magna Car Top Systems GmbH, Bietigheim-Bissingen (DE)

( * ) Notice: Subject to any disclaimer, the term of this patent is extended or adjusted under 35 U.S.C. 154(b) by 0 days.

(21) Appl. No.: 11/531,203

(22) Filed: Sep. 12, 2006

(65) Prior Publication Data

US 2007/0057530 A1    Mar. 15, 2007

(30) Foreign Application Priority Data

Sep. 12, 2005  (DE) ............... 10 2005 043 512

(51) Int. Cl.
*B60J 7/14*     (2006.01)
*B62D 33/027*   (2006.01)

(52) U.S. Cl. ................. 296/146.8; 296/107.08
(58) Field of Classification Search ............... 296/124, 296/51, 146.8, 106, 108, 220.01
See application file for complete search history.

(56) References Cited

U.S. PATENT DOCUMENTS

| 3,387,406 A | 6/1968 | Coker et al. |
| 5,655,331 A | 8/1997 | Schrader et al. |
| 6,702,361 B2 | 3/2004 | Russke |
| 6,913,307 B2 * | 7/2005 | Hesse ............... 296/107.17 |
| 2003/0218353 A1 | 11/2003 | Russke |

FOREIGN PATENT DOCUMENTS

| DE | 1 630 488 | 5/1971 |
| DE | 295 11 422 U1 | 3/1996 |
| DE | 103 48 493 A1 | 5/2005 |
| DE | 103 49 885 A1 | 5/2005 |
| EP | 0 989 009 A1 | 3/2000 |
| EP | 1 364 823 A1 | 11/2003 |
| EP | 1 475 262 A1 | 11/2004 |
| FR | 2 865 163 | 7/2005 |

* cited by examiner

*Primary Examiner*—Dennis H Pedder
*Assistant Examiner*—Melissa A Black
(74) *Attorney, Agent, or Firm*—Brooks Kushman P.C.

(57) ABSTRACT

For a steep-back vehicle having an open body, a rear closure is connected to the vehicle body by a supporting frame in such a way that the rear closure when designed as a rear door may be swivelled with respect to the supporting frame about a vertical axis, and when designed as a tailgate may be raised up together with the supporting frame about a horizontal axis.

17 Claims, 6 Drawing Sheets

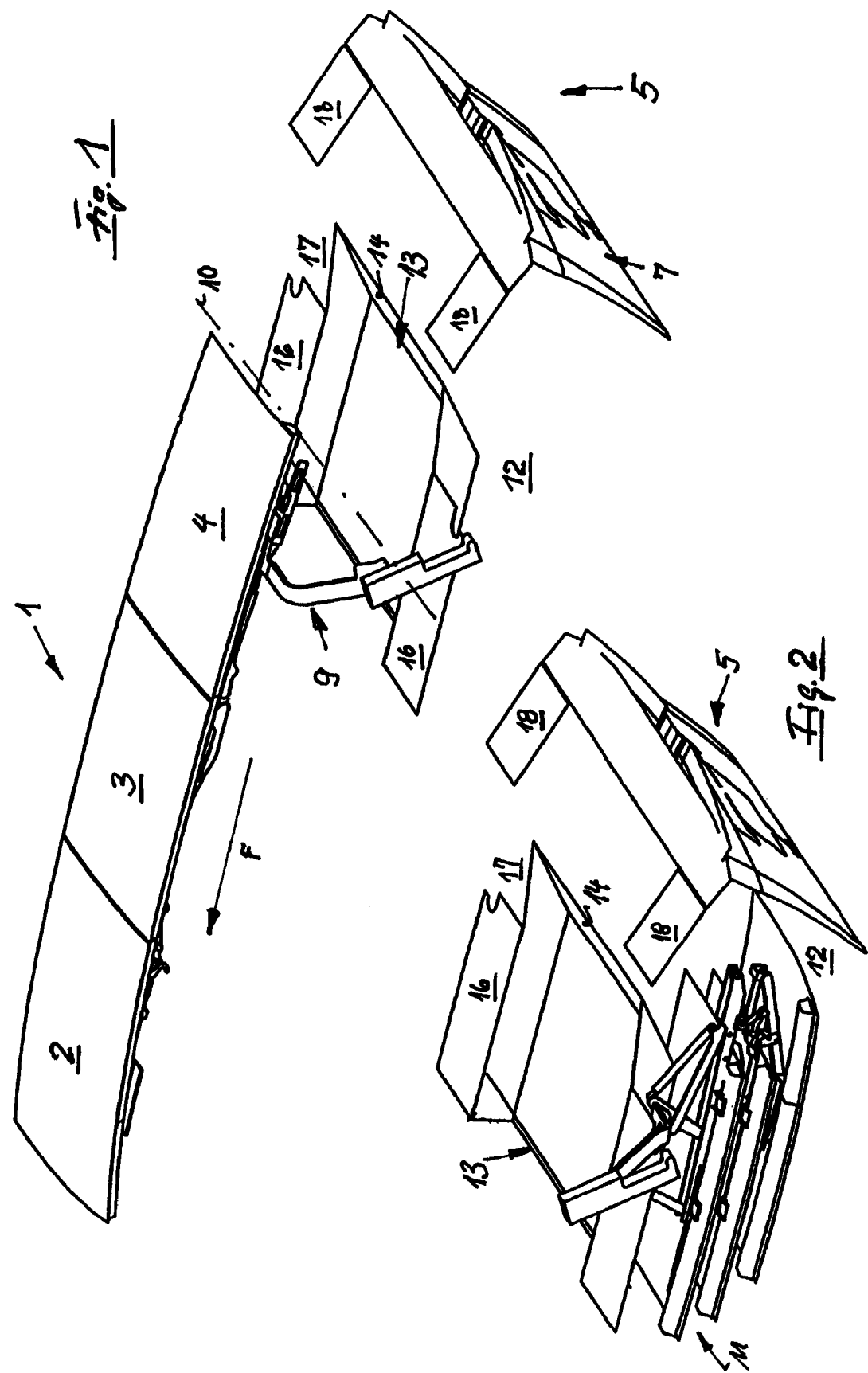

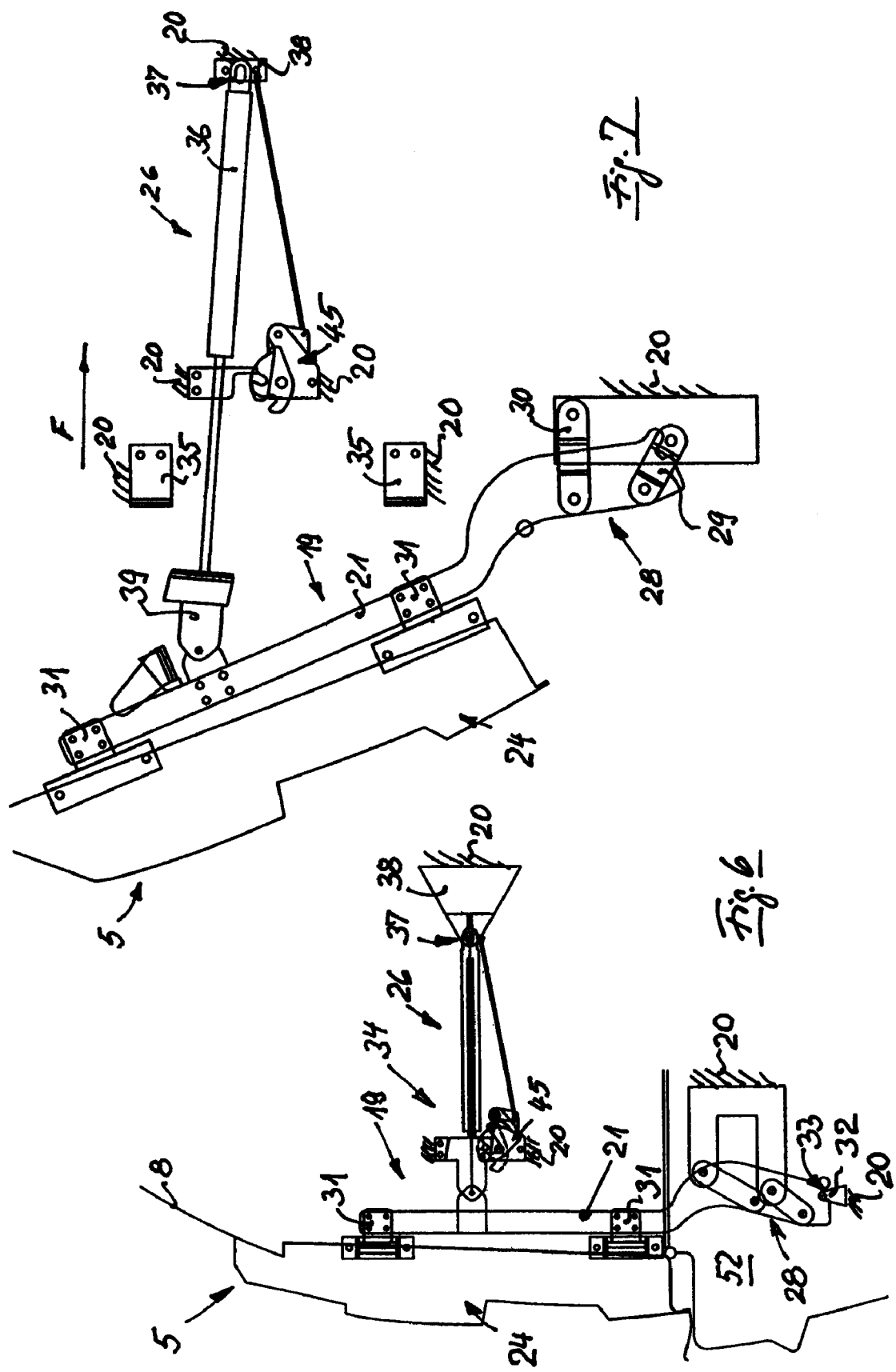

STEEP-BACK VEHICLE HAVING AN OPEN BODY

CROSS-REFERENCE TO RELATED APPLICATIONS

This application claims foreign priority benefits under 35 U.S.C. § 119(a)-(d) to DE 10 2005 043 512.2, filed Sep. 12, 2005, which is hereby incorporated by reference in its entirety.

BACKGROUND OF THE INVENTION

1. Field of the Invention

The present invention relates to a steep-back vehicle having an open body.

2. Background Art

EP 0 989 009 B1 describes a steep-back vehicle having a multi-part roof. The roof parts of the roof are adjacent to one another and cover a roof section when the roof is closed. The roof adjoins a rear section opposite the direction of forward vehicle travel. A rear closure such as a door or a tailgate is associated with the rear section. For opening the roof, the roof parts may be moved to the rear along roof beams in sliding guides to be combined into a roof part stack. The roof part stack as a whole may be transferred to a stored position. In the stored position, the roof part stack may be lowered into the part of the rear door or tailgate situated below the rear window, or in a receptacle in the floor region of the vehicle. When designed as a rear door, the rear closure associated with the rear section is laterally hinge-mounted and swivelable to the rear. Various solutions are proposed for the design of the rear closure as a tailgate, such as swivel capability of the tailgate to the rear and downward when the swivel axis is in the floor region, or to the rear and upward when the swivel axis is at the roof level.

In conjunction with vehicles having a pontoon-shaped body with an open body having a rear trunk covered by a trunk lid, the roof is stored in the trunk. The trunk lid swivels to the rear and upward in a service position, i.e., swivelled out forward and upward for loading of the roof. For two-way swivel capability of the trunk lid, a supporting frame is associated with the underside of the trunk lid. The supporting frame may be swivelled to the rear and upward about a rear swivel axis. The supporting frame on its opposite ends supports the bearing of the trunk lid for swiveling forward and upward about a horizontal transverse axis. In the closed position of the trunk lid, the supporting frame is secured to the vehicle body by the rear swivel axis and a front locking device. The locking device includes a locking part secured to the vehicle body and a latching part fixed to the supporting frame. To open the trunk lid into its rearward and upwardly swivelled position providing access to the storage compartment for the folding roof, the supporting frame is acted upon by an actuating device. The actuating device as it makes contact in the opening direction of the supporting frame opens the locking part by a corresponding control connection, thereby releasing the latching part associated with the supporting frame. In order to open the locking part by the control connection in the opening direction of the supporting frame by coming into contact with the actuating device designed as an actuating cylinder, the actuating cylinder is supported on the vehicle body side by a rotary sliding guide, by which the control connection acts upon the locking part when the actuating cylinder is under appropriate load, and the locking part may be opened in its rearward and upwardly swivelled position when the supporting frame swivels (DE 195 16 876 C1 which corresponds to U.S. Pat. No. 5,655,331).

SUMMARY OF THE INVENTION

An object of the present invention is a steep-back vehicle having a laterally mounted rear door, or a tailgate, which swivels out to the rear.

In accordance with an embodiment of the present invention, the design of a conventional rear door arrangement with engagement with the rear opening as a door soffit and a sealing system between the door soffit and the door is maintained, while allowing the rear door (or tailgate) to be swivelled out and downward from the soffit. There is relatively little additional effort required as a result of the design according to the present invention, and in particular it is not necessary to intervene in the basic design of the vehicle.

In conjunction with such an approach according to the present invention, it is advantageous to link the supporting frame by a rod kinematic system in order to also have downward swiveling capability with lift adjustment. A four-bar linkage is preferred for the design of the rod kinematic system. Such a design is practical with regard to housing the supporting frame and the linkages for the supporting frame in the floor region of the vehicle. Optionally, the supporting frame and the linkages for the supporting frame are housed on supporting structures already present in the vehicle. Such a design is practical with regard to low demands for sealing.

For the supporting frame, which may be designed as an open frame delimited by lateral supports, a first support is a hinge support and a second support is a lock support. The necessary transverse mounting for the supports is achieved via the attachment to the vehicle body, resulting in an extremely low space requirement for the supporting frame.

Corresponding to the essentially symmetrical design of the supporting frame with respect to the longitudinal central plane of the vehicle, it is also practical to provide a symmetrical design for the actuating device associated with the supporting frame in such a way that one actuating device is associated with each support. Similarly, it is practical to associate a stop with each support in the swivelled-in direction with respect to the interior, i.e., in the sense of a bracing of the rear door or tailgate against the vehicle body in the closed position of the rear door or tailgate, and to support the supports in this stop position also in the vertical direction. For this purpose, it is practical to provide oppositely situated stop guides in the vertical direction, into and between which the one support part, or a part of the actuating device which is connected to the support and fixes the support in the vertical direction, is inserted.

The actuating device is advantageously formed by an actuating cylinder. A locking member is associated in the connection region of the actuating cylinder on the piston rod side with respect to the particular support for the support frame. The actuating cylinder is fixable by a body-side mounting. The body-sie mounting is preferably formed by a rotary latch system. The rotary latch system includes a rotary latch and a ratchet which secures the rotary latch in its locked position. The rotary latch and the ratchet may be jointly acted upon by a torsion spring. Specifically, the rotary latch is acted upon in its released position and the ratchet is acted upon in its locked position.

The movement of the rotary latch into its open position is advantageously coupled to the actuation of the actuating device as the rotary latch must be opened in conjunction with the swiveling out of the tailgate. For this purpose, the actuating cylinder is supported against the vehicle body by a rotary sliding guide. The rotary sliding guide is in the form of a rotary sliding joint. As such, the loading of the rotary sliding guide and the associated displacement of the actuating cylinder resulting from the action of the cylinder in the actuating direction on the swivelled-out position of the tailgate—starting from its position in the rotary sliding guide produced by tensile loading when the tailgate is swivelled into its closed position—can be converted into a control motion for the ratchet.

The above features, and other features and advantages of the present invention are readily apparent from the following detailed descriptions thereof when taken in connection with the accompanying drawings.

BRIEF DESCRIPTION OF THE DRAWINGS

FIG. 1 illustrates an isolated illustration of a three-part roof, in its closed position having an essentially planar roof level, for a vehicle having an open body which has a roof opening bounded on the longitudinal side by roof beams and to be covered by the roof parts, and which to the rear, opposite the direction of travel, merges into a rear section to be closed by a rear closure, and to which a storage compartment for the roof parts which have been transferred to their open position is associated forward in the direction of travel in the floor region of the vehicle, the storage compartment on the upper side is delimited with respect to a cargo area for luggage or the like by a cover, and the rear closure in the form of a door can be swivelled to the rear about a vertical axis, and in the form of a tailgate can be swivelled to the rear and downward about a horizontal axis, and in the illustration according to FIG. 1 is shown in this position swivelled to the rear and downward;

FIG. 2 illustrates an illustration corresponding to FIG. 1, the roof parts being layered to form a roof part package which is accommodated in the upside-down position in the storage compartment;

FIGS. 6 and 7 illustrate the association of the rear closure with a supporting frame linked to the vehicle body, when in the form of a rear door (FIG. 6) the rear closure can be swivelled out to the rear, and when in the form of a tailgate (FIG. 7) the closure can be swivelled to the rear and downward.

DETAILED DESCRIPTION OF THE PREFERRED EMBODIMENT(S)

Figure 3:
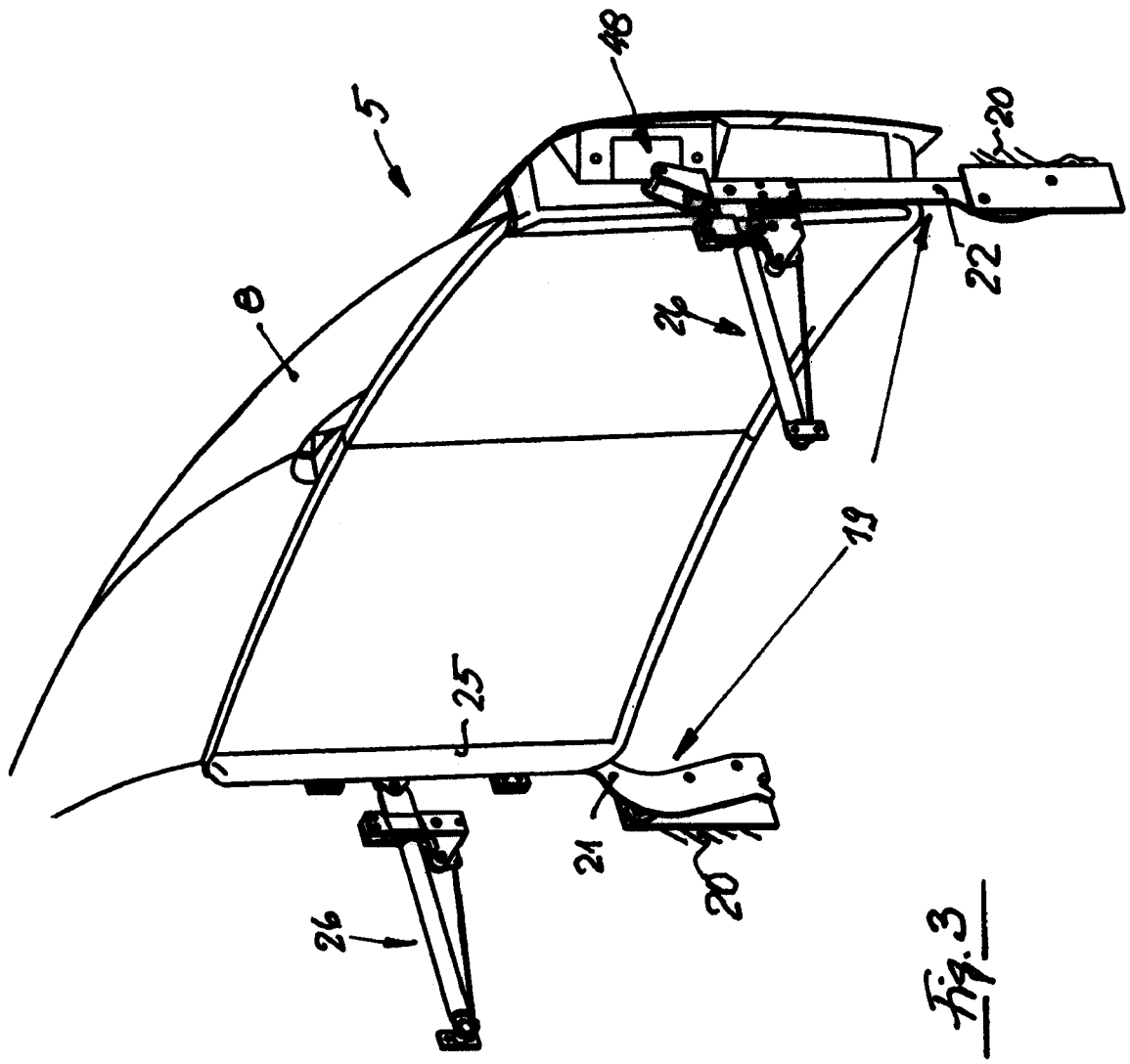
FIG. 3 illustrates an isolated illustration of the rear closure in a position corresponding to the closed position.

In the figures, reference numeral 1 denotes the roof of a steep-back vehicle having an open body (not shown in greater detail). Roof 1 includes front roof part 2, center roof part 3, and rear roof part 4. In the closed position of roof 1 shown in FIG. 1, roof parts 2, 3, 4 adjoin one another and may be moved with respect to one another by rod assembly connections (not shown) into an open position in which roof parts 2, 3, 4 lie one on top of the other as a roof part stack. In the roof part stack, front roof part 2 covers center roof part 3 and center roof part 3 covers rear roof part 4.

In the closed position of roof 1, roof parts 2, 3, 4 on the longitudinal side lie between roof beams on the body side. The roof beams laterally delimit the roof opening covered by roof 1 in the closed position. The front boundary of the roof opening is formed by the cowl or an extended cowl region of the vehicle body. The roof opening merges into a rear section at the rear of the vehicle body, with which a rear closure 5 is associated. Rear closure 5 forms a rear door 6 or a tailgate 7 depending on its particular function. Rear closure 5 contains a rear window 8 in the connecting region to roof 1. Rear window 8 adjoins roof 1 in the upper region when the roof is closed.

When roof 1 is opened, roof parts 2, 3, 4 are first brought together into a roof part package 11 in which front and center roof parts 2, 3 lie above rear roof part 4 in a layered manner. A rotary guide rod assembly 9 connected to rear roof part 4 may swivel to swivel the stacked roof part package 11 to the rear and downward about a vehicle transverse axis 10 into an upside-down position. Roof part package 11 in the upside-down position can be accommodated in a storage compartment 12 within the lower rear region of the vehicle body such as the floor region of the vehicle. A cover 13 is associated with storage compartment 12. Cover 13 delimits storage compartment 12 with respect to a cargo area situated thereabove. With regard to rotary guide rod assembly 9, FIG. 1 shows strictly for illustrative purposes axis 10, running in the transverse direction of the vehicle, about which roof part package 11 may be moved between the roof plane and storage compartment 12.

Rear closure 5 is indicated in FIG. 1 in a position swivelled out to the rear, thereby forming a tailgate 7. The swiveling of tailgate 7 to the rear creates clearance space for swiveling roof part package 11 to and from storage compartment 12 such that roof 1 may be moved to and from the roof plane.

Cover 13 is designed such that roof part package 11 may be swivelled by rotary guide rod assembly 9 when rear closure 5 is swivelled out to the rear while cover 13 remains in place. As such, cover 13, as seen in FIGS. 1 and 2, runs upwardly at an angle in rear region 14. To create a passage region for rotary guide rod assembly 9 during swiveling, cover 13 running in the region of outwardly folded border strips 16 includes recesses 17 with respect to rear closure 5. When rear closure 5 is shut, inserts 18 of rear closure 5 overlap recesses 17 of cover 13. Inserts 18 conform to the shape of recesses 17. Inserts 18 project forward from rear closure 5 in its closed position to cover recesses 17 in a sealing manner. In conjunction with inserts 18 associated with rear closure 5, when rear closure 5 is shut a flat sealed cover which includes cover 13 is obtained. As a result, a flat delimitation of storage compartment 12 with respect to the cargo area thereabove is obtained.

Inserts 18 are pivotably connected to rear closure 5 such that the inserts project with respect to rear closure 5 in its function as a tailgate 7 (FIGS. 1 and 2) or, in a position extending essentially in alignment with the plane of rear closure 5, may be swivelled in upwardly when roof part package 11 is swivelled into or out of storage compartment 12. With respect to rear closure 5 in its function as a rear door 7, inserts 18 swivel about a vertical axis so that when rear door 6 is opened the access through the rear opening is not limited by inserts 18 projecting with respect to rear closure 5.

Figure 4:
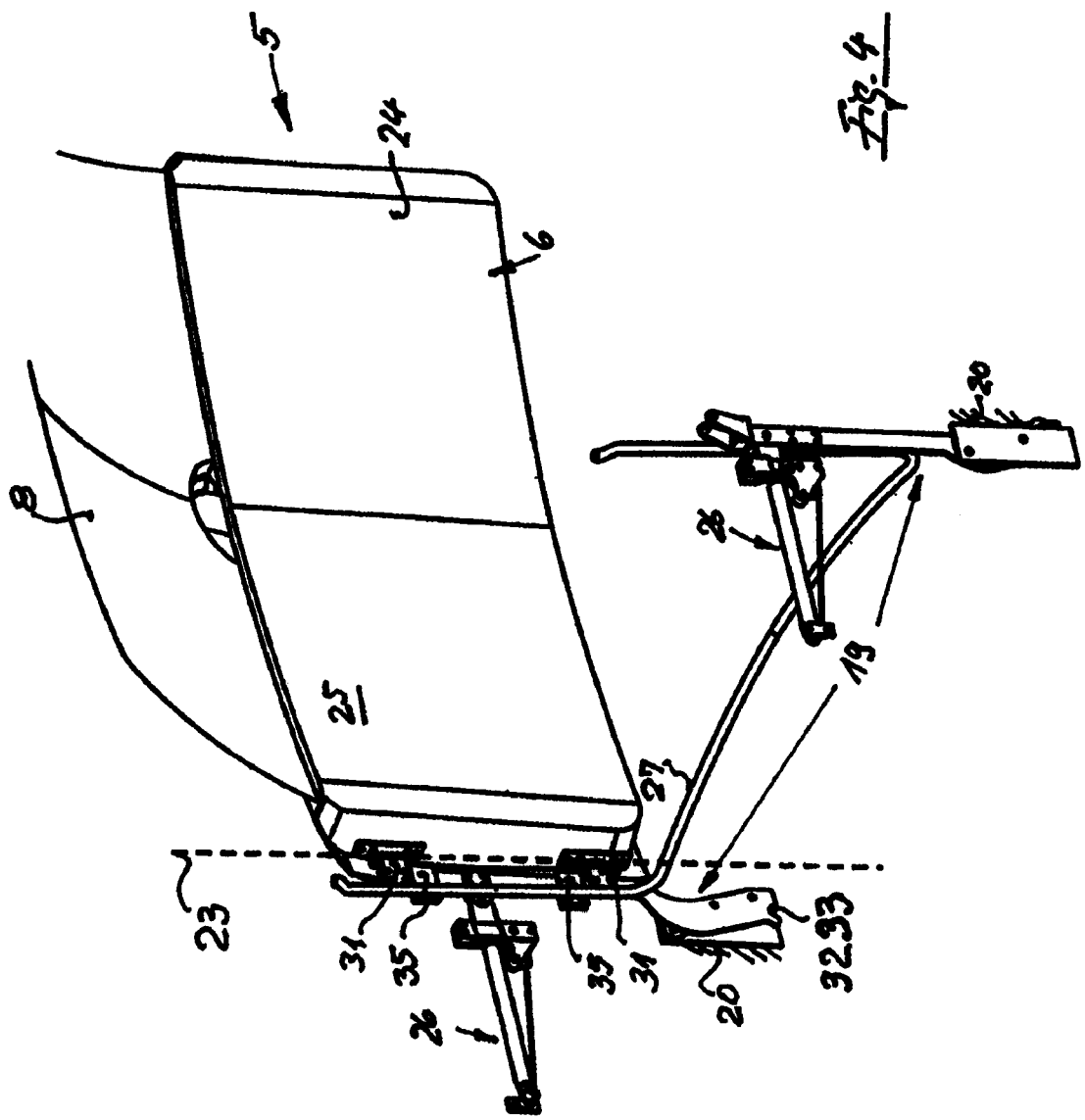
FIG. 4 illustrates an illustration corresponding to FIG. 3, with a closure in the form of a rear door swivelled out to the rear about a vertical axis.
Figure 5:
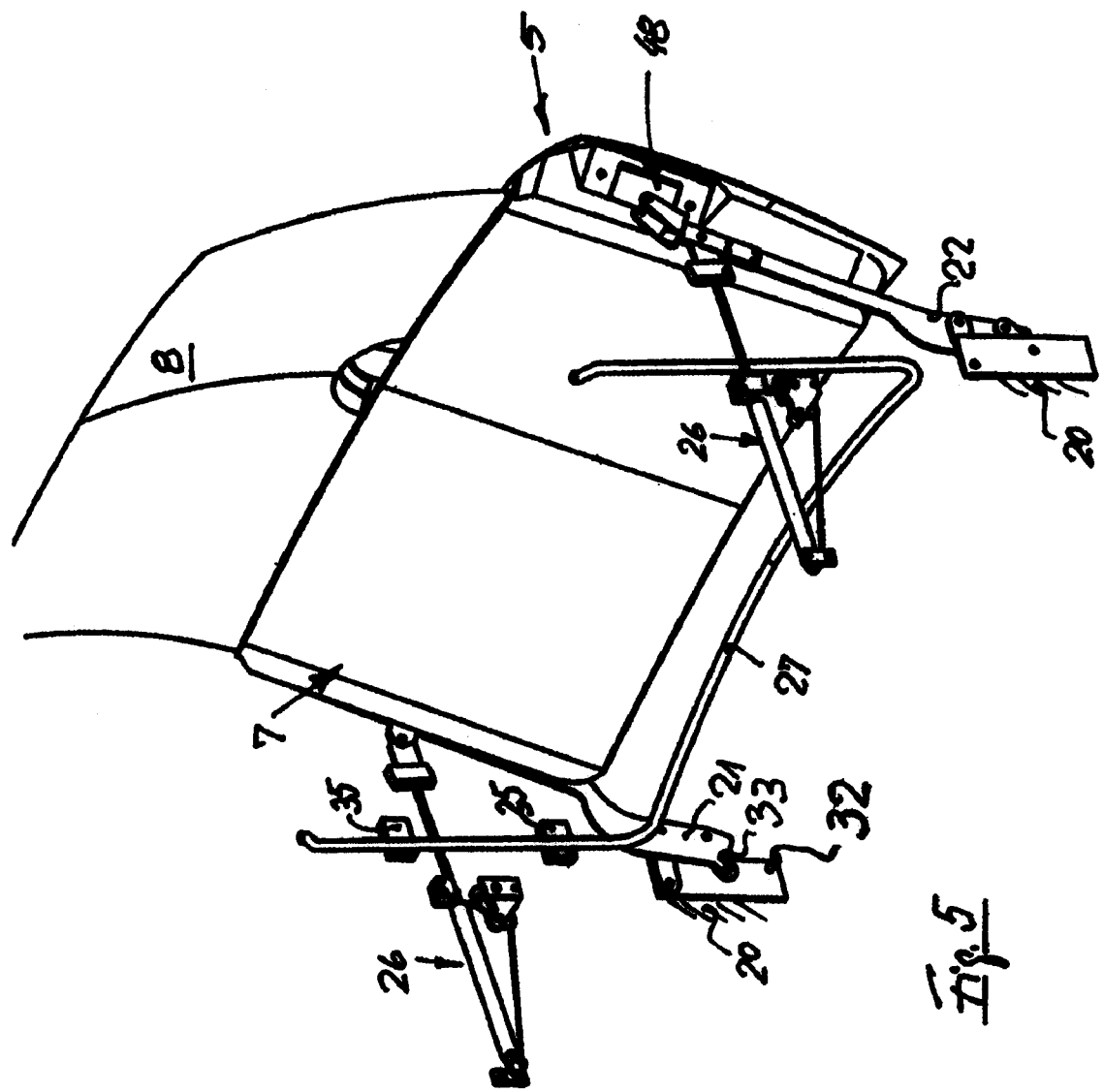
FIG. 5 illustrates an illustration corresponding to FIG. 3, with a closure in the form of a tailgate swivelled out to the rear.
Figure 8:
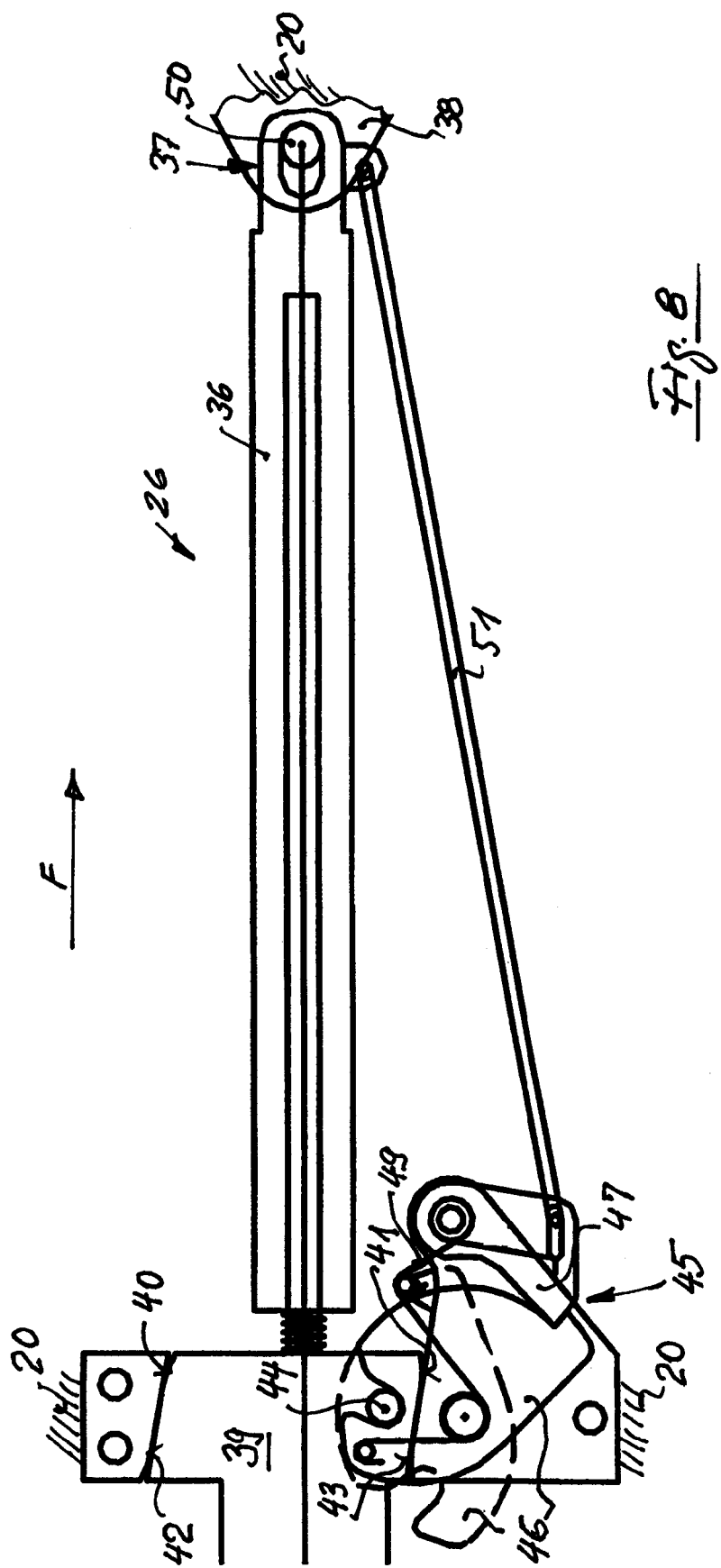
FIG. 8 illustrates an isolated schematic illustration of the actuating device.

In FIGS. 3, 4, and 5, rear closure 5 (simplified with inserts 18 omitted) is shown in views directed into the interior. FIG.

3 illustrates rear closure 5 in its closed position covering the rear vehicle body opening. FIG. 4 illustrates rear closure 5 as a rear door 6 which is swivelled-out. FIG. 5 illustrates rear closure 5 as a tailgate 7 which is swung out to the rear.

These different functions are made possible because rear closure 5, as shown in greater detail in FIGS. 6 and 7, is attached to the vehicle body by a supporting frame 19. In a perspective construction view, supporting frame 19 has vertical first and second supports 21, 22. Supports 21, 22 are pivotably linked to vehicle body 20. First support 21 forms a hinge support and second support 22 forms a lock support. When rear closure 5 is in the closed position, and likewise in the swivelled-out position when designed as a rear door 6, supports 21, 22 are situated in the region of the soffit. The soffit is formed by the rear opening for rear closure 5 in the region 24 thereof located beneath rear window 8. An indicated interior trim panel 25 is associated with rear closure 5. As such, an at least substantially concealed position for supporting frame 19 and actuating devices 26 associated with supports 21, 22 of the supporting frame is obtained as a result of rear closure 5 and its interior trim panel 25. For this purpose, supports 21, 22 and actuating devices 26 which respectively engage with supports 21, 22 are situated in the longitudinal side region of vehicle body 20. This longitudinal side region of vehicle body 20 corresponds to rear closure 5 and extends practically over the entire width of the vehicle. As such, actuating devices 26 are likewise accommodated in a concealed manner within an interior trim panel on the body side. This is illustrated by seal 27 associated with rear closure 5 in its lower closure region 24 on the body side.

Actuating device 26, as well as the attachment of supporting frame 19 to vehicle body 20 and to rear closure 5, are shown in greater detail in FIGS. 6 and 7. FIGS. 6 and 7 illustrate the side view of hinge support 21 of supporting frame 19.

Hinge support 21 and lock support 22 for supporting frame 19 are linked at the lower end region thereof by a four-bar linkage system 28 on vehicle body 20. Four-bar linkage system 28 includes a shorter lower guide rod 29 and a longer upper guide rod 30. Guide rods 29, 30 in the closed position of rear closure 5 run essentially in parallel and extend downward at an acute angle. As such, when actuating device 26 acts upon supporting frame 19 (i.e., respective supports 21, 22) in the direction opposite the direction of travel F, supporting frame 19 together with rear closure 5 is swivelled out to the rear about a horizontal instantaneous axis which is specified by the relative positions of guide rods 29, 30. The connection between actuating device 26 and supporting frame 19 is established in the region of the supporting frame which is upwardly offset for linkage to vehicle body 20, preferably close to the upper ends of supports 21, 22 which extend in the vertical direction until close to the upper boundary of the lower closure region 24 of rear closure 5. A hinge connection 31 to closure region 24 is respectively associated with hinge support 21 in the upper end region and adjacent to the floor region of the vehicle body.

When rear closure 5 is acted upon by actuating device 26 in the direction opposite the direction of travel F, simultaneous to the downward swiveling to the rear the actuating device is lifted upward due to the position of guide rods 29, 30. As such, sufficient access is obtained with respect to adjacent vehicle body parts, in particular the rear bumper assembly 52 beneath rear closure 5. This change in height during the outwardly swiveling motion, or in the opposite direction when rear closure 5 in the form of a tailgate 7 is swung into its closed position, is used to make a locking engagement between the lower ends of supports 21, 22 and a support on the vehicle body side. The body-side support is designed as a stationary engaging part 32 with which a notched receptacle 33 is associated on the side of the lower boundary of respective support 21, 22. As a result of the support between engaging part 32 and receptacle 33, rear closure 5 is stationarily supported against the vehicle body in the vertical direction as well, particularly in conjunction with an additional stop guide 34, to be described in greater detail below, situated in the traversal path of actuating device 26. In the direction of travel the support is preferably achieved by stops 35 on the vehicle body side which preferably are situated at the same level as or adjacent to hinges 31, and between which actuating device 26 extends.

Each actuating device 26 includes an actuating cylinder 36. Actuating cylinder 36 is linked via a rotary sliding joint 37 to a bracket 38. Bracket 38 is stationary with respect to vehicle body 20. The piston rod of actuating cylinder 36 is connected to a connecting head 39. Connecting head 39 is pivotably linked to respective support 21, 22. Connecting head 39 has upper and lower guide surfaces 40, 41 with which stop guides 42, 43 thereof fixed to the vehicle body are associated as counter-surfaces. Between the counter-surfaces connecting head 39 together with its guide surfaces 40, 41 arrive at the closed position of rear closure 5 when rear closure 5 in the form of a tailgate 7 is retracted. The guide surfaces in the retracted direction, corresponding to the direction of travel F, preferably have a slight downward slope, i.e., in the sense of bracing or support of supporting frame 19 by its supports 21, 22 on engaging part 32 fixed to vehicle body (FIG. 6).

In the engaged and supported position thus achieved for connecting head 39, a locking member 44 associated therewith is held by a mounting 45. Mounting 45 is fixed to the vehicle body and has a rotary latch 46 and a ratchet 47, so that connecting head 39, and by supporting frame 19 and rear closure 5 connected thereto, are fixed in the closed position. In this closed position rear closure 5 is fixed relative to supporting frame 19, on the one hand with respect to hinge support 21 via hinges 31. On the other hand, in this closed position rear closure 5 is fixed relative to supporting frame 19 via a lock assembly 48 provided between lock support 22 and rear closure 5. Lock assembly 48 is locked with respect to vehicle body 20 and in the position of supporting frame 19 which corresponds to the closed position of rear closure 5 is openable for swiveling out rear closure 5 in the form of a rear door 6, so that rear closure 5 in the form of a rear door 6 may be swivelled to the rear about vertical axis 23 defined by hinges 31.

When actuating cylinder 36 is retracted, the respective locking member 44 enters the intercepting jaw of associated rotary latch 46, and locking member 44 causes rotary latch 46 to swivel into the locked blocking position of rotary latch by ratchet 47. In the opposite direction, i.e., in the direction of the open position of the rotary latch, rotary latch 46 is loaded by a torsion spring 49 by which ratchet 47 is simultaneously pre-tensioned with respect to rotary latch 46 in the direction of the blocking position of the ratchet.

Corresponding to the support of actuating cylinder 36 with respect to vehicle body 20 by a rotary sliding joint 37, actuating cylinder 36 is displaced relative to axle journals 50 of rotary sliding joint 37. Axle journals 50 are stationary with respect to vehicle body 20, depending on the direction of loading by actuating cylinder 36. The displacement of actuating cylinder 36 with respect to axle journals 50 during extension of actuating cylinder 36 is employed to disengage ratchet 47 from its locked position by a pull connector 51 for the ratchet. As such, the locking of rotary latch 46 is released and connecting head 39 may be moved along stop guides 42, 43. The distance between the stop guides is set so that actuating cylinder 36, together with its piston rod passing therebetween, has the necessary vertical clearance to be able to follow the lifting swivel motion, forced by rod kinematic system 28 during swiveling, for supporting frame 19 and rear closure 5 supported thereby.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A steep-back vehicle comprising:
    a vehicle body having a rear roof opening extending to the floor region of the vehicle, the rear roof opening adjoining a roof section of the vehicle;
    a roof having a plurality of roof parts, wherein the roof is movable between a closed position in which the roof parts adjoin one another to cover the roof section of the vehicle and a stored position in which the roof parts stack on top of one another to thereby expose the roof section of the vehicle;
    a closure associated with the rear roof opening, the closure movable between a closed position in which the closure covers the rear roof opening and an opened door position in which the closure is swivelled on one side about a vertical axis along a lateral side of the vehicle body such that the opposite side of the closure is moved outward from the rear roof opening, the closure is further movable between the closed closure position and an opened tailgate position in which the closure is swivelled about a horizontal axis in the floor region of the vehicle such that the closure is moved outward and downward from the rear roof opening;
    wherein the roof is movable between the closed and opened roof positions when the closure is in the opened tailgate position;
    a supporting frame having a hinge support and a lock support respectively located on lateral sides of the vehicle body, the supports are pivotably connected at first ends to the floor region of the vehicle body to swivel about the horizontal axis, the hinge support is connected at a second end to the one side of the closure and the lock support is connectable at a second end to the opposite side of the closure, the supports enable the closure to be movable between the closed closure position and the opened door position when the second end of the lock support is disconnected from the opposite end of the closure, the supports enable the closure to be movable between the closed closure position and the opened tailgate position when the second end of the lock support is connected to the opposite end of the closure;
    first and second actuating devices respectively associated with the supports, wherein the actuating devices are actuable to swivel the supports about the horizontal axis to move the supports together with the closure outward and downward from the rear roof opening when the second end of the lock support is connected to the opposite end of the closure; and
    locking devices respectively associated with the actuating devices to fix the supports in place with respect to the rear roof opening against respective mountings on the vehicle body when the closure is in the closed closure position.

2. The vehicle of claim 1 further comprising:
    a pair of locking supports respectively associated with the supports, the first ends of the supports coming to rest from above on the respective locking supports when the rear closure is in the closed closure position such that the supporting frame is supported in the vertical and longitudinal directions of the vehicle in the region of the first ends of the supports.

3. The vehicle of claim 1 wherein:
    the first ends of the supports are pivotably connected to the floor region of the vehicle body by respective rod kinematic systems.

4. The vehicle of claim 3 wherein:
    the supports are adjustably lifted by the rod kinematic systems.

5. The vehicle of claim 3 wherein:
    each rod kinematic system is formed by a four-bar linkage system.

6. The vehicle of claim 1 wherein:
    each mounting includes a rotary latch in association with the respective actuating device, and the rotary latch may be swivelled by the locking member into a blocked position and locked by a ratchet.

7. The vehicle of claim 6 wherein:
    the rotary latch is acted upon in its released position and the ratchet is acted upon its locked position by a common torsion spring.

8. The vehicle of claim 6 wherein:
    each actuating device has a pivotably linked actuating cylinder on the vehicle body side.

9. The vehicle of claim 8 wherein:
    the pivotable linkage of the actuating cylinder with respect to the vehicle body is a rotary sliding joint which is path-limited in the lifting direction of the actuating cylinder.

10. The vehicle of claim 9 wherein:
    the actuating cylinder is connected with the ratchet via a pull connector, and the ratchet is released from its locked position with respect to the rotary latch when the actuating cylinder extends for swiveling the supporting frame.

11. A steep-back vehicle comprising:
    a vehicle body having a rear roof opening extending to the floor region of the vehicle, the rear roof opening adjoining a roof section of the vehicle;
    a roof having a plurality of roof parts, wherein the roof is movable between a closed position in which the roof parts adjoin one another to cover the roof section of the vehicle and a stored position in which the roof parts stack on top of one another to thereby expose the roof section of the vehicle;
    a laterally hinge-mounted rear closure associated with the rear roof opening;
    a supporting frame connected to the vehicle body;
    an actuating device associated with the supporting frame, wherein the actuating device actuates to swivel the supporting frame;
    a locking device associated with the actuating device to fix the supporting frame in its swivelled-in position with respect to the rear opening against a mounting on the vehicle body;
    wherein the rear closure is mounted on the supporting frame and is linked to the vehicle body in the floor region so as to be pivotable about a horizontal axis, wherein the rear closure together with the supporting frame swivels out from the rear opening;

wherein the mounting includes a rotary latch in association with the actuating device, and the rotary latch may be swivelled by the locking member into a blocked position and locked by a ratchet;

wherein the actuating device, together with a connecting head bearing the locking member, is situated between stop guides oppositely situated in the vertical direction in the locking direction of the locking member with respect to the rotary latch.

12. The vehicle of claim 11 wherein:

the actuating device has a pivotably linked actuating cylinder on the vehicle body side.

13. The vehicle of claim 8 wherein:

the rear closure is a rear door which swivels about a vertical axis and in its closed position forms a seal with respect to a soffit of the rear opening.

14. The vehicle of claim 11 wherein:

the rear closure is a tailgate which swivels out from the rear opening, wherein the tailgate swivels to the rear and downward about a horizontal axis.

15. The vehicle of claim 11 wherein:

the supporting frame is linked to the vehicle body in the floor region thereof by a rod kinematic system.

16. The vehicle of claim 15 wherein:

the supporting frame is adjustably lifted by the rod kinematic system.

17. The vehicle of claim 15 wherein:

the rod kinematic system is formed by a four-bar linkage system, by which the supporting frame when swivelled out is lifted and swivelled to the rear and downward.

* * * * *